—

3,703,497
OXIMES AS ACCELERATORS FOR THE AMINE CURING OF EPOXY RESINS
Donald Dante Carlos, Louisville, and David Alan Shimp, Lyndon, Ky., assignors to Celanese Coatings Company, New York, N.Y.
No Drawing. Filed Feb. 24, 1971, Ser. No. 118,568
Int. Cl. C08g 30/14
U.S. Cl. 260—47 EN  9 Claims

---

ABSTRACT OF THE DISCLOSURE

The curing of glycidyl ethers by aliphatic amines is accelerated by oximes, giving cured resins having little or no color derived from the accelerator.

---

BACKGROUND OF THE INVENTION

This invention relates to thermosetting plastics. More particularly, this invention relates to amine-cured epoxy resins.

Resilient seamless flooring is a recent innovation, having been developed during the last decade. A basic seamless floor is composed of a single continuous layer or coat of thermosetting plastic which is firmly bonded to a desired substrate. Seamless chip flooring is a relatively new concept in resilient seamless flooring and involves the on-site encasement of decorative chips in a clear, liquid plastic matrix.

The total number of coats and the thickness of each coat of thermosetting plastic applied to any given substrate depend in part upon the nature of the substrate, the composition of the thermosetting plastic, the method of application, and the properties or characteristics desired in the finished floor. Generally, any resilient seamless floor is comprised of a base coat and optionally one or more finish coats. A seamless chip floor usually consists of a base coat, an optional chip coat, decorative chips, one or more glaze coats, and one or more finish coats.

Because the color and pattern of a seamless floor are determined by the base coat and decorative chips, if used, the glaze and finish coats are clear. Obviously, any discoloration of the base coat resin will alter the color of the floor, especially with lightly-colored floors. Discoloration of the glaze and/or finish coats not only will alter the color of the floor, but also will mask the effect of decorative chips, if employed. Thus it is imperative that the resins employed for the base, glaze, and finish coats be free from discoloration from any cause, either before or during curing. Freedom from discoloration also is important when glaze coat resins are applied to walls and other surfaces as protective coatings.

Epoxy resins are among the materials which have been employed successfully as base coats and glaze coats, particularly the epoxy resins based on glycidyl ethers. Such resins, when cured with aliphatic amines, possess an outstanding number of advantages, such as excellent adhesion to concrete, plywood, brick, ceramic tile, and plastic tile, resistance to bleedthrough, moisture resistance, low odor, flexibility (resilience), and low temperature curability.

Although listed above as an advantage of glycidyl ethers cured with aliphatic amines, low temperature curability in reality is a requirement of any resin intended for use in seamless flooring. This requirement stems from the rather obvious fact that it is wholly impractical to heat the resin once applied to the substrate. Thus any applied resin must cure at ambient temperature, which may be as low as about 40 degrees Fahrenheit.

In general, glycidyl ethers may be cured at ambient temperature by aliphatic amines. The lower the ambient temperature, however, the longer is the time required to cure the resin. It therefore is desirable to utilize an accelerator to keep cure times within reasonable limits.

Various classes of compounds are known to be accelerators for aliphatic amine/glycidyl ether systems. All, however, suffer disadvantages. For example, as a consequence of very pronounced temperature dependence, aliphatic and aromatic organic acids and aliphatic tertiary amines result in a short working life (pot life) and a very long film cure time. Aliphatic and aromatic mercaptans impart excessive and usually intolerable odor to the resin system. And sulfonamides and phenols discolor the resin system. The discoloration by phenols, the most commonly used accelerator class, is most pronounced with phenol itself, with less color being developed with such substituted phenols as nonylphenol.

Of course, the development of color in the resin system as a result of employing certain accelerators is time dependent. It is not practical, however, to mix all ingredients at the site and use immediately. Normally, the accelerator and curing agent are mixed together and stored for future use. Even if extended storage times were not common, color derived from the accelerator still would be a problem since such color can develop in the cured resin. Hence altered or improved handling procedures preparatory to installing a seamless floor cannot eliminate accelerator-related color development.

SUMMARY OF THE INVENTION

It is therefore an object of the present invention to provide novel accelerators for amine-curable epoxy resins, e.g., glycidyl ethers.

It is also an object of the present invention to provide accelerators which, when admixed with aliphatic amine curing agents, will not discolor upon prolonged storage.

Yet another object is to provide accelerators which will not discolor the cured epoxy resin.

These and other objects will be apparent to those skilled in the art from a consideration of the specification and claims which follow.

In accordance with the present invention, glycidyl ethers may be cured with aliphatic amines in the presence of an oxime as an accelerator. Furthermore, the use of oximes as accelerators prevents or minimizes the development of accelerator-related color in both the accelerator-curing agent mixture and the cured resin.

Oximes as used herein can be represented by the following general formula:

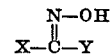

wherein X is an organic radical which is aliphatic, alicyclic, or aromatic, and which can contain one or more isonitroso or oxime groups, i.e.,

and Y is either hydrogen or an organic radical which is aliphatic, alicyclic, or aromatic, and which can contain one or more isonitroso or oxime groups.

DESCRIPTION OF THE INVENTION

Oximes are well-known to those skilled in the art and can be prepared by several procedures. For example, the reaction of hydroxylamine hydrochloride or sulfate with a carbonyl compound in the presence of a base yields an oxime. Similar reagents which do not require the presence of a base include sodium hydroxylamine disulfonate and hydroxylamine-O-sulfonic acid. A second procedure involves the nitrosation of active methylene compounds with such reagents as nitrous acid, sodium nitrite in glacial acetic acid, and alkyl nitrites in the presence of hydrochloric acid. Another procedure involves the partial reduction of nitro compounds, such as the selective hydrogenation of nitro paraffins and the zinc-acetic acid reduction of aliphatic nitro olefins. A forth, rather specific procedure is the hydroxylamination of dihydropyridines.

The first procedure outlined above is perhaps the most generally useful method for obtaining oximes. By means of the second procedure, however, the isonitroso or oxime group can be introduced into a molecule while leaving carbonyl groups intact. Thus di- or polyoximes are often readily obtained by employing first the second procedure, with an appropriate compound, followed by the first procedure. For a detailed discussion of the preparative methods for oximes, see R. B. Wagner and H. D. Zook, "Synthetic Organic Chemistry," John Wiley and Sons, Inc., New York, 1953, pp. 739–745 (Chapter 27).

Many oximes exist in two stereoisometric forms, presumably as a result of the carbon-nitrogen double bond. A brief discussion of the stereochemistry of the oximes may be found in C. R. Noller, "Chemistry of Organic Compounds," Second Edition, W. B. Saunders Company, Philadelphia, 1957, pp. 542–545. Often literature references to oximes make no reference to the stereoisometric form or forms involved. However, for the purposes of the present invention, the stereoisometric form of the oxime is not known to be critical. Hence the term "oxime" as used herein means either the anti-form, the syn-form, or a mixture thereof.

As indicated by the general formula given hereinbefore, the novel accelerators of the present invention may be mono-, di-, or polyoximes. Examples of oximes encompassed by said general formula are formaldoxime, acetaldoxime, propionaldoxime, n-butyraldoxime, isobutyraldoxime, isovaleraldoxime, heptaldoxime, acetoxime, methyl ethyl ketoxime, dipropyl ketoxime, dibutyl ketoxime, ethyl butyl ketoxime, methylglyoxime, α-oximinopropionic acid, biacetyl monoxime, dimethylglyoxime, α-oximinobutyric acid, α-oximinocaproic acid, glutardialdoxime, ethyl α-oximinoacetoacetate, ethyl α-oximinovalerate, ethyl α-oximinocaproate, 2,3-butanedione dioxime, cyclohexanone oxime, 2-isonitrosocyclohexanone, 1,2-cyclohexanedione dioxime, cyclopentanone oxime, methylcyclohexanone oxime, 1,2-cycloheptanedione dioxime, camphor oxime, isonitrosocamphor oxime, ketocineole oxime, isonitrosoketocineole oxime, carvone oxime, menthone oxime, fenchone oxime, hydroxydihydrocarvone oxime, ionone oxime, nitrosopinene oxime, benzaldoxime, salicylaldoxime, anisaldoxime, tolualdoxime, o-nitrobenzaldoxime, m-nitrobenzaldoxime, p-nitrobenzaldoxime, 2,4-dinitrobenzaldoxime, o-methoxybenzaldoxime, m-methoxybenzaldoxime, 3,4-methylenedioxybenzaldoxime, cinnamaldoxime, m-nitrocinnamaldoxime, acetophenone oxime, isonitrosoacetophenone oxime, benzophenone oxime, propiophenone oxime, benzoin oxime, p-chloroacetophenone oxime, o-nitroacetophenone oxime, p-nitroacetophenone oxime, p-methylacetophenone oxime, α-oximino-β-phenylpropionic acid, methyl α-naphthyl ketoxime, p-phenylacetophenone oxime, desoxybenzoin oxime, 3-acetylphenanthrene oxime, and the like.

A first preferred class of oximes can be represented by the following general formula:

wherein $Z_1$ is a monovalent organic radical having fewer than about 18 carbon atoms and which is either aliphatic or aromatic. A more preferred subclass is represented by the following general formula:

wherein $Z_2$ is a monovalent hydrocarbon radical having fewer than about 18 carbon atoms and which is either aliphatic or aromatic.

A second preferred class of oximes can be represented by the following general formula:

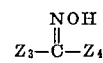

wherein $Z_3$ and $Z_4$ independently are monovalent aliphatic organic radicals having fewer than about 18 carbon atoms per radical. A more preferred subclass is represented by the following general formula:

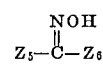

wherein $Z_5$ and $Z_6$ independently are monovalent aliphatic hydrocarbon radicals having fewer than about 18 carbon atoms per radical.

The term "organic radical" as used herein includes not only unsubstituted radicals but also substituted radicals wherein the substituent groups can contain atoms other than carbon and hydrogen, e.g., halogen, oxygen, nitrogen, and the like. The term "hydrocarbon radical" as used herein also includes both unsubstituted and substituted radicals; however, the substituent groups, if present, shall contain only carbon and hydrogen.

The most preferred oximes of the present invention are the lower molecular weight mono-oximes, said monooximes having fewer than about eight carbon atoms and having no substituent groups which are reactive with 1,2-epoxide groups.

The glycidyl ethers useful in this invention are glycidyl ethers which contain more than one 1,2-epoxy group per molecule and which lack other groups reactive with aliphatic amines. They can be saturated or unsaturated, aliphatic cycloaliphatic, aromatic, or heterocyclic, and monomeric or polymeric in nature.

Useful glycidyl ethers include glycidyl ethers of polyhydric phenols obtained by reacting a polyhydric phenol in an excess of epichlorohydrin with sodium hydroxide. Such polyhydric phenols include bisphenol A or 2,2-bis(4-hydroxyphenyl)propane, resorcinol, hydroquinone, 4,4'-dihydroxybenzophenone, 1,2-bis(4-hydroxyphenyl)-ethane, 1,5-dihydroxynaphthalene, 4,4'-dihydroxybiphenyl, and novolak resins containing more than two phenol moieties linked through methylene bridges.

Other glycidyl ethers of polyhydric phenols are polymers prepared by reacting from 1.1 up to about 2 moles of epichlorohydrin with 1 mole of dihydric phenol or by reacting diepoxides with additional dihydric phenol.

Still other glycidyl ethers are glycidyl ethers of polyhydric alcohols made by reacting a polyhyric alcohol and epichlorohydrin with an acidic catalyst such as boron trifluoride and subsequently treating the resulting product with an alkaline dehydrohalogenating agent. Included among the polyhydric alcohols that can be used in the preparation of these glycidyl ethers are glycerine, ethylene glycol, propylene glycol, polypropylene glycol, diethylene glycol, hexanetriol, pentaerythritol, trimethylolethane, trimethyolpropane, and trimethylolbutane.

The aliphatic amines useful in the present invention are those which contain at least two amine nitrogen atoms and more than two active hydrogen atoms per molecule. Examples of such amines includes, among others, the alkylene polyamines, such as ethylenediamine, diethylenetriamine, triethylenetetramine, tetraethylenepentamine, iminobispropylamine, methyliminobispropylamine, hexamethylenediamine, poly(oxypropylene)diamine, and the like. Also included among the aliphatic amines are cyanoethylated and hydroxyalkylated aliphatic amines, which can be prepared by reacting amommia or such amines as the alkylene polyamines with acrylonitrile and monoepoxides, respectively; examples of suitable monoepoxides include ethylene oxide, propylene oxide, and monoglycidyl ethers and esters. Amine adducts formed by reacting epoxy resins with an excess of an aliphatic polyamine also are useful in the present invention.

The proportion of accelerator to aliphatic amine curing agent primarily is a function of the curing performance desired. Generally, the ratio of accelerator to curing agent will be in the range of from about 0.2:1 to 1:1, based on the ratio of the number of oxime groups in the accelerator to the number of amine groups in the curing agent. Preferably, this ratio is in the range of from about 0.3:1 to about 0.7:1.

While the ratio of curing agent to epoxy resin is in part a function of the desired curing performance and the desired properties of the cured resin, generally this ratio will vary from about 0.5:1 to about 1.5:1, based on the ratio of the number of active amine hydrogen atoms in the curing agent to each epoxide equivalent in the epoxy resin. The preferred range is from about 0.8:1 to about 1.2:1.

Usually the accelerator and curing agent are premixed and stored until used. However, such premixing is neither required nor essential to the invention. In addition to the accelerator, curing agent, and epoxy resin, other materials can be included, depending upon the intended use and desired properties. These other materials include fillers, such as asbestos, aluminum oxide, sand, and the like, pigments, dyes, plasticizers, reactive diluents, and the like. Although not preferred, solvents, such as aromatic hydrocarbons, ketones, alcohols, and ether-alcohols, may be employed.

Although the compositions of the present invention find particular utility when cured at ambient temperature, their usage is not limited to low temperaure cures. They can be cured over a wide range of temperatures, from about 40 degrees Fahrenheit to about 400 degrees Fahrenheit.

Without intending to limit it in any manner, the present invention will be more fully described by the following examples which illustrate certain perferred embodiments of the invention. Unless otherwise indicated, all percentages and parts are by weight.

EXAMPLE 1

As a control, 100 parts of Epi-Rez 510, the diglycidyl ether of bisphenol A having an epoxide equivalent weight of 180–200 (Epi-Rez is a trademark of Celanese Coatings Company, Louisville, Ky.) and 26 parts of Jeffamine D–230, a poly(oxypropylene)diamine having a molecular weight of about 230 (Jeffamine is a trademark of Jefferson Chemical Company, Inc., Austin, Tex.), are blended to form a homogeneous mixture or resin system. The Jeffamine D–230, hereinafter referred to as the converter portion of the resin system, with or without an accelerator, has prior to blending a Gardner-Holdt color of less than 1 and a Gardner-Holdt viscosity of A4. The properties of the resultant resin system at 77 degrees Fahrenheit are summarized as follows:

Gel time of 100 g. mass _____ 11 hrs., 50 min.
Sweat-out on 100 mil film at 60% relative humidity _____ None.
Sweat-out on 10 mil film at 95% relative humidity _____ Pronounced.

The term "sweat-out" refers to the surface phenomenon whereby the surface of a curing film becomes greasy and moist. This phenomenon results generally when aliphatic polyamine-epoxy resin systems are cured at ambient temperature under atmospheric conditions, high relative humidity in particular. Sweat-out is believed to be caused by the reactivity of the amine to atmospheric carbon dioxide. Amine cabonates form at the surface and these hygroscopic salts absrob moisture from the atmosphere, presenting a wet appearance. Sweat-out is undesirable not only for aesthetic reasons but also because intercoat and interlaminar adhesion is impaired.

A comparison of Example 1 with Example 2 shows that the oximes of the present invention reduce sweat-out.

EXAMPLE 2

The procedure of Example 1 is repeated, except that 7.1 parts of benzaldoxime is added as an accelerator to the Jeffamine D–230. The properties of both the converter portion and the resin system (final mixture) at 77 degrees Fahrenheit are summarized below:

Gardner-Holdt color of converter portion _____ 1.
Gardner-Holdt viscosity of converter portion _____ A4.
Gel time of 100 g. mass _____ 8 hrs., 21 min.
Sweat-out on 10 mil film at 60% relative humidity _____ None.
Sweat-out on 10 mil film at 95% relative humidity _____ Slight.

EXAMPLES 3 AND 4

The procedure of Example 2 is repeated, except that the benzaldoxime is replaced with 5.1 parts of methyl ethyl ketoxime and 5.1 parts of n-butyraldoxime, respectively. Except for gel times of 100 g. masses, the properties of the converter portions and the resin systems at 77 degrees Fahrenheit are identical to those obtained in Example 2. The gel times of 100 g. masses are as follows:

Example:                         Gel time of 100 g. mass
3 _____ 10 hrs., 17 min.
4 _____ 9 hrs., 36 min.

EXAMPLES 5 AND 6

As the preceding examples show, the converter portion has very little, if any, color immediately upon mixing the accelerator with the Jeffamine D–230. Thus a long-term storage test is necessary. Accordingly, two converter portions are prepared by adding to 26 parts of Jeffamine D–230, 7.3 parts of benzaldoxime and 13 parts of nonylphenol, respectively. The control accelerator is nonylphenol, selected because of its widespread use in the seamless flooring industry. The two converter portions are stored at 110 degrees Fahrenheit and checked periodically for color. The results are summarized below:

|  | Example 5 | Example 6 |
|---|---|---|
| Accelerator | Benzaldoxime | Nonylphenol. |
| Gardner-Holdt color upon mixing | 1 | 1. |
| Gardner-Holdt color after 4 months | 1 | 4. |
| Gardner-Holdt color after 6 months | 2–3 | 5–6. |

It is obvious that the oxime significantly reduces color development in the converter portion upon long-term storage. It is significant that both accelerators are present in the same molar ratio, i.e., 0.059 mole of accelerator to 0.113 mole of amine (or 0.226 mole of amine nitrogen atoms).

EXAMPLES 7–12

The procedure of Example 2 is repeated, except that the amount of benzaldoxime employed is varied from 8 parts to 18 parts. The following properties of the resin system at 77 degree Fahrenheit are obtained:

| Example | Parts benz-aldoxime | Gel time, 100-G mass, minutes | Pencil hardness after 1 week |
|---|---|---|---|
| 7 | 8 | 165 | HB |
| 8 | 10 | 150 | HB |
| 9 | 12 | 125 | HB |
| 10 | 14 | 105 | HB |
| 11 | 16 | 90 | HB |
| 12 | 18 | 75 | HB |

Thus the cure rate is a function of the level of accelerator employed, a particularly useful property. Note that hardness is not affected by increased levels of accelerator.

It is to be understood that the foregoing detailed description is given merely by way of illustration and that many variations may be made therein without departing from the spirit and scope of the present invention. Examples of such variations are the employment of mixtures of oximes as accelerators, mixtures of aliphatic polyamines as curing agents, and mixtures of epoxy resins, to name only a few.

Having thus disclosed the invention, what is claimed is:

1. An ambient temperature curable composition comprising:
   (a) an epoxy resin containing more than one 1,2-epoxide group per molecule, said resin being a glycidyl ether,
   (b) an aliphatic polyamine containing at least two amine nitrogen atoms and more than two amine hydrogen atoms per molecule, and
   (c) an oxime accelerator having the general formula:

$$\underset{\underset{\text{X—C—Y}}{\|}}{\text{NOH}}$$

wherein X is an organic radical which can be aliphatic, alicyclic, or aromatic, and which can contain one or more isonitroso or oxime groups, and Y is either hydrogen or an organic radical which is aliphatic, alicyclic, or aromatic, and which can contain one or more isonitroso or oxime groups, wherein the ratio of the number of oxime groups in (c) to the number of amine groups in (b) is in the range of from about 0.2:1 to about 1:1, and the ratio of the number of active amine hydrogen atoms in (b) to the number of 1,2-epoxide groups in (a) is in the range of from about 0.5:1 to about 1.5:1.

2. The composition of claim 1 wherein said oxime accelerator has the general formula:

$$\underset{\underset{\text{Z}_1\text{—C—H}}{\|}}{\text{NOH}}$$

wherein $Z_1$ is a monovalent organic radical having fewer than about 18 carbon atoms and which is either aliphatic or aromatic.

3. The composition of claim 2 wherein said oxime accelerator has the general formula:

$$\underset{\underset{\text{Z}_2\text{—C—H}}{\|}}{\text{NOH}}$$

wherein $Z_2$ is a monovalent hydrocarbon radical having fewer than about 18 carbon atoms and which is either aliphatic or aromatic.

4. The composition of claim 3 wherein said oxime accelerator is benzaldoxime.

5. The composition of claim 3 wherein said oxime accelerator is n-butyraldoxime.

6. The composition of claim 1 wherein said oxime accelerator has the general formula:

$$\underset{\underset{\text{Z}_3\text{—C—Z}_4}{\|}}{\text{NOH}}$$

wherein $Z_3$ and $Z_4$ independently are monovalent aliphatic organic radicals having fewer than about 18 carbon atoms per radical.

7. The composition of claim 6 wherein said oxime accelerator has the general formula:

$$\underset{\underset{\text{Z}_5\text{—C—Z}_6}{\|}}{\text{NOH}}$$

wherein $Z_5$ and $Z_6$ independently are monovalent aliphatic hydrocarbon radicals having fewer than about 18 carbon atoms per radical.

8. The composition of claim 7 wherein said oxime accelerator is methyl ethyl ketoxime.

9. The cured composition obtained by curing the composition of claim 1 at ambient temperature.

References Cited

UNITED STATES PATENTS 3,294,842  12/1966  Swanson _____ 260—566 A

WILLIAM H. SHORT, Primary Examiner

T. E. PERTILLA, Assistant Examiner

U.S. Cl. X.R.

106—39 R; 117—138.8 R, 148, 161 ZB, 169 R; 161—184; 260—2 N, 29.1 R, 37 Ep, 59, 830 TW